United States Patent
Kora et al.

(10) Patent No.: US 12,215,517 B1
(45) Date of Patent: Feb. 4, 2025

(54) ANTI-DROWNING SYSTEM FOR USE WITH A POOL

(71) Applicants: Bakary Kora, Forest Park, GA (US); Tyranesha N. Kora, Forest Park, GA (US)

(72) Inventors: Bakary Kora, Forest Park, GA (US); Tyranesha N. Kora, Forest Park, GA (US)

(*) Notice: Subject to any disclaimer, the term of this patent is extended or adjusted under 35 U.S.C. 154(b) by 152 days.

(21) Appl. No.: 18/095,050

(22) Filed: Jan. 10, 2023

(51) Int. Cl.
*E04H 4/06* (2006.01)
*G08C 17/02* (2006.01)
*H02K 7/116* (2006.01)
*H04W 76/10* (2018.01)

(52) U.S. Cl.
CPC ............ *E04H 4/065* (2013.01); *G08C 17/02* (2013.01); *H02K 7/1166* (2013.01); *H04W 76/10* (2018.02)

(58) Field of Classification Search
CPC .................................................... E04H 4/065
USPC ............................................................ 4/504
See application file for complete search history.

(56) References Cited

U.S. PATENT DOCUMENTS

| | | | |
|---|---|---|---|
| 3,052,893 A * | 9/1962 | McClure | E04H 4/08 52/126.5 |
| 4,165,543 A | 8/1979 | Reinert | |
| 4,262,373 A | 4/1981 | Chambers | |
| D344,805 S | 3/1994 | Jones | |
| 6,421,962 B2 | 7/2002 | McNamara | |
| 7,325,259 B2 | 2/2008 | Wood | |
| 9,394,709 B2 * | 7/2016 | Iosim | E04H 4/084 |
| 2008/0256698 A1 | 10/2008 | Smart | |
| 2011/0271435 A1 | 11/2011 | Young | |

FOREIGN PATENT DOCUMENTS

WO    9201849    2/1992

* cited by examiner

*Primary Examiner* — Lauren A Crane

(57) ABSTRACT

The anti-drowning system for use with a pool is a safety structure. The anti-drowning system for use with a pool comprises a mesh structure, a plurality of worm drives, and a pool. The pool is a manmade structure that is defined elsewhere in this disclosure. The pool further comprises a bed. The mesh structure and the plurality of worm drives forms a safety structure for the pool. The mesh structure is a fluid permeable structure that inserts into the pool. The plurality of worm drives attach to the mesh structure such that the plurality of worm drives raises and lower the mesh structure within the pool. The mesh structure forms a horizontally oriented supporting surface. The plurality of worm drives adjusts the elevation of the mesh structure such that the mesh structure can lift a distressed swimmer out of the pool.

12 Claims, 5 Drawing Sheets

ANTI-DROWNING SYSTEM FOR USE WITH A POOL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to a pool covering made of flexible material. (E04H4/10)

SUMMARY OF INVENTION

The anti-drowning system for use with a pool is a safety structure. The anti-drowning system for use with a pool comprises a mesh structure, a plurality of worm drives, and a pool. The pool is a manmade structure that is defined elsewhere in this disclosure. The pool further comprises a bed. The mesh structure and the plurality of worm drives forms a safety structure for the pool. The mesh structure is a fluid permeable structure that inserts into the pool. The plurality of worm drives attach to the mesh structure such that the plurality of worm drives raises and lower the mesh structure within the pool. The mesh structure forms a horizontally oriented supporting surface. The plurality of worm drives adjusts the elevation of the mesh structure such that the mesh structure can lift a distressed swimmer out of the pool.

These together with additional objects, features and advantages of the anti-drowning system for use with a pool will be readily apparent to those of ordinary skill in the art upon reading the following detailed description of the presently preferred, but nonetheless illustrative, embodiments when taken in conjunction with the accompanying drawings.

In this respect, before explaining the current embodiments of the anti-drowning system for use with a pool in detail, it is to be understood that the anti-drowning system for use with a pool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the anti-drowning system for use with a pool.

It is therefore important that the claims be regarded as including such equivalent construction insofar as they do not depart from the spirit and scope of the anti-drowning system for use with a pool. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
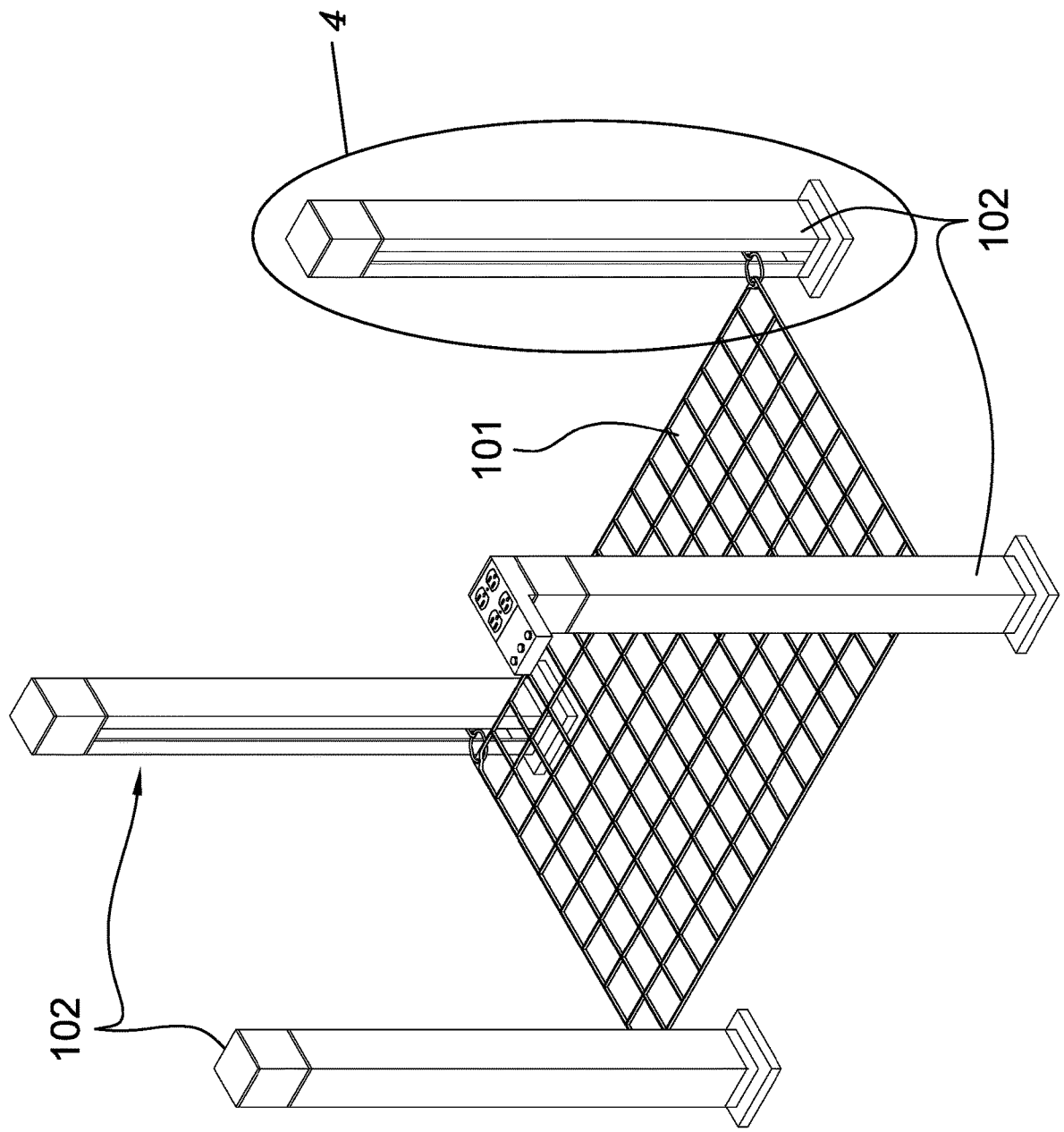
FIG. 1 is a perspective view of an embodiment of the disclosure.
Figure 2:
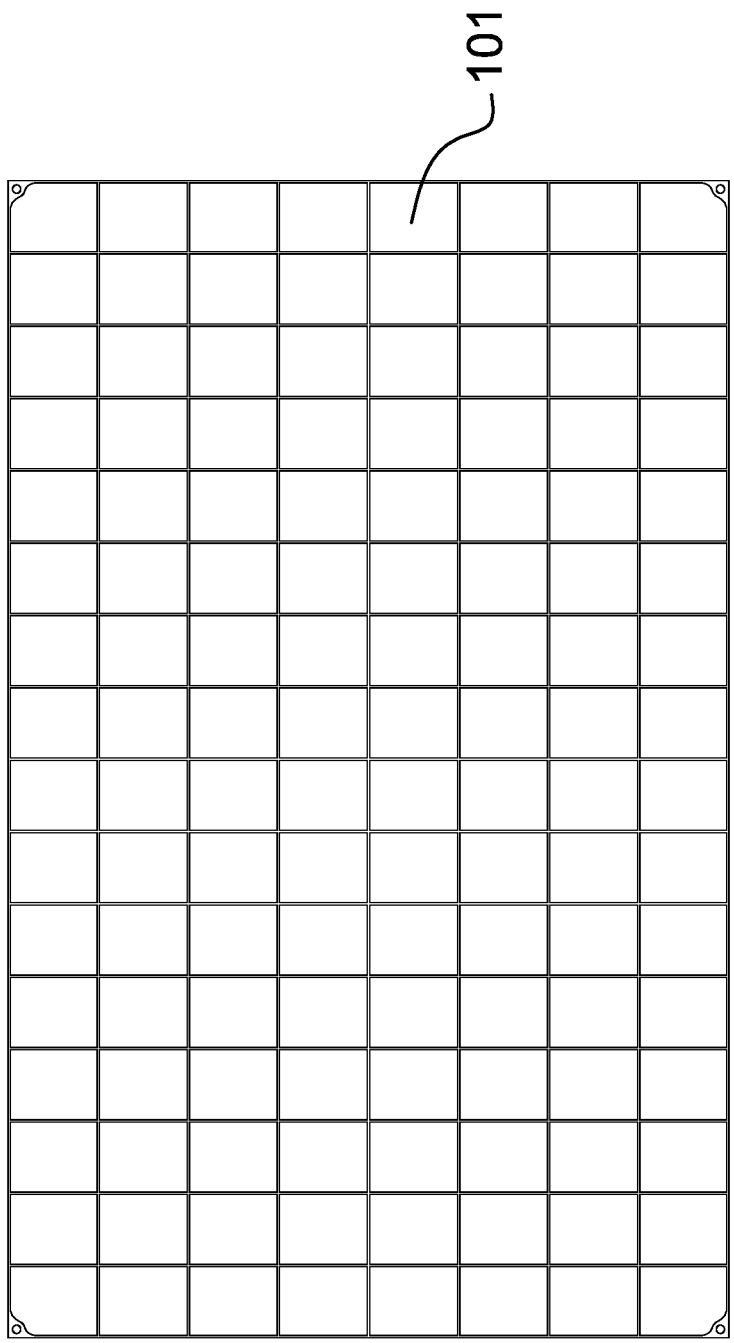
FIG. 2 is a top view of an embodiment of the disclosure.
Figure 3:
FIG. 3 is a side view of an embodiment of the disclosure.
Figure 4:
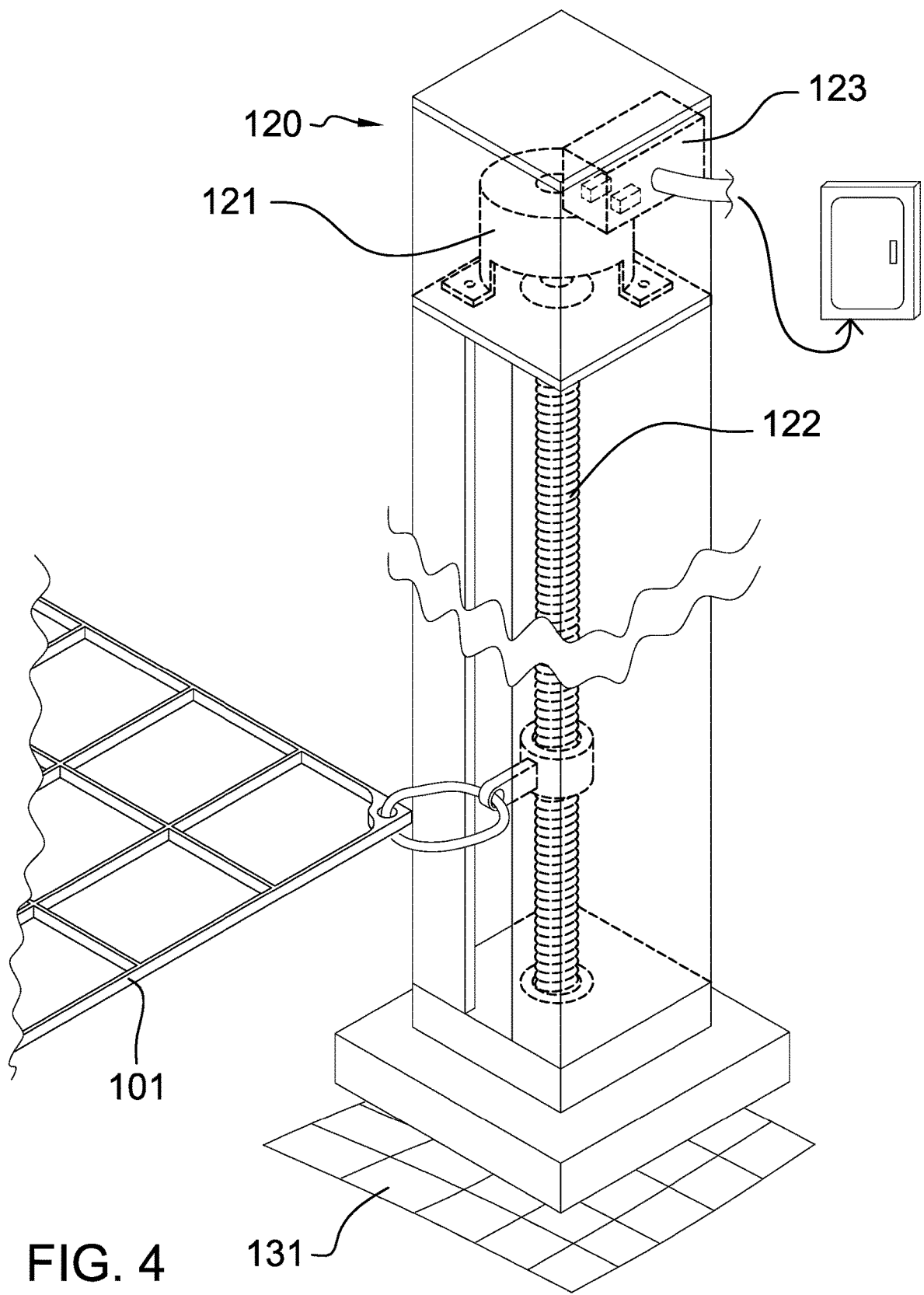
FIG. 4 is a detail view of an embodiment of the disclosure.
Figure 5:
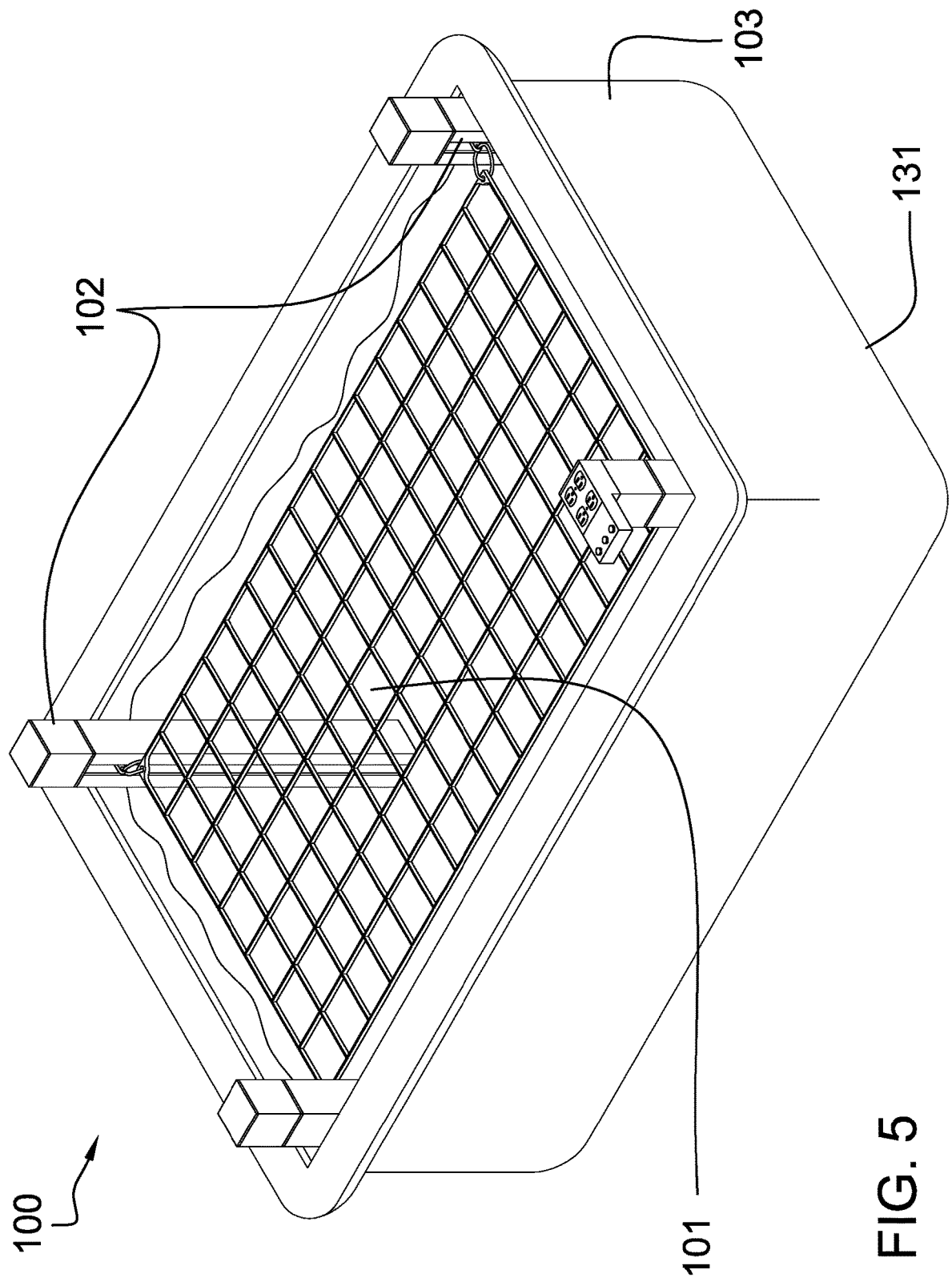
FIG. 5 is an in-use view of an embodiment of the disclosure.
Figure 6:
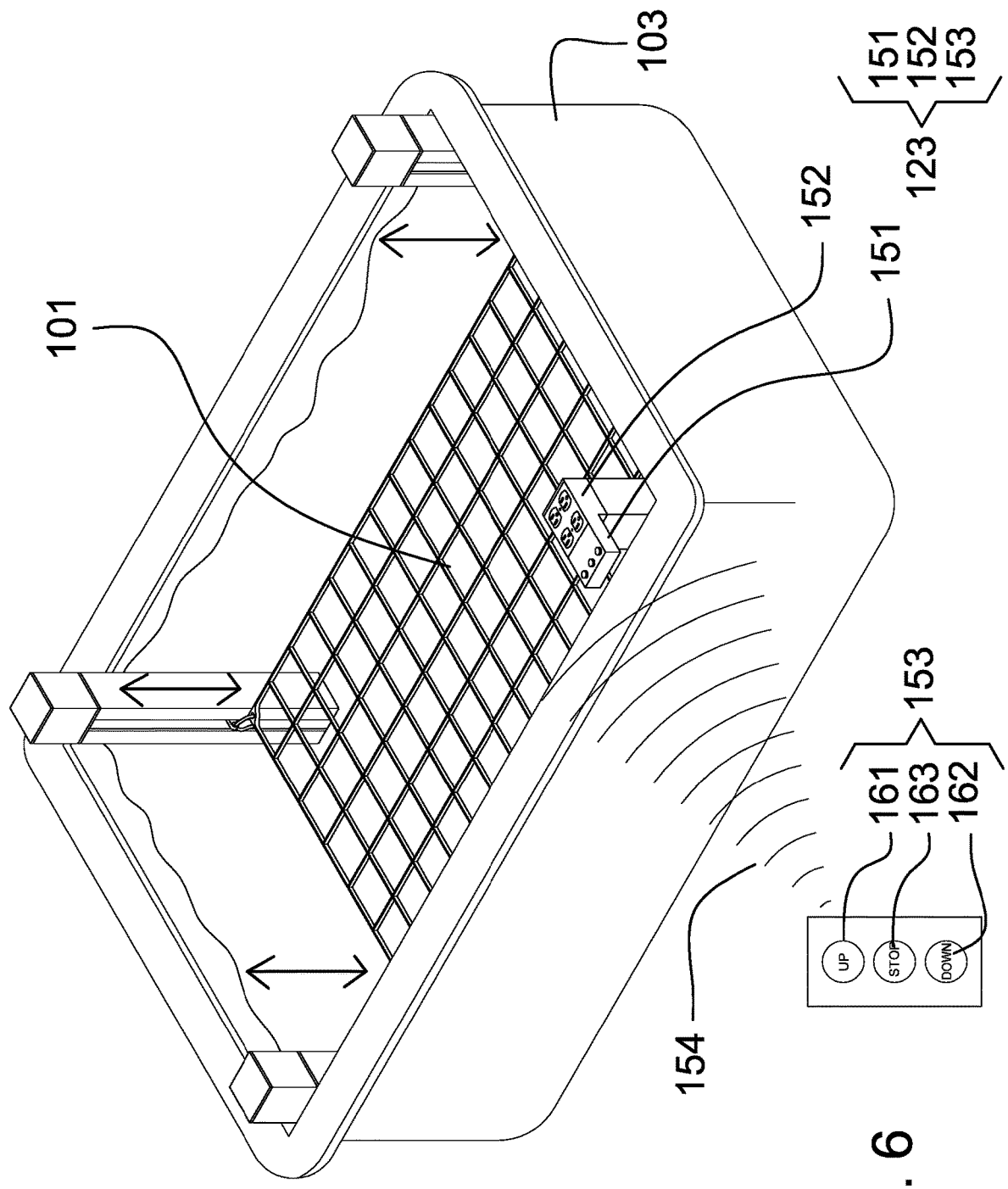
FIG. 6 is an in-use view of an embodiment of the disclosure.

Detailed reference will now be made to one or more potential embodiments of the disclosure, which are illustrated in FIGS. 1 through 6.

The anti-drowning system for use with a pool 100 (hereinafter invention) is a safety structure. The invention 100 within a pool 103 comprises a mesh structure 101, a plurality of worm drives 102, and a pool 103. The pool 103 is a manmade structure that is defined elsewhere in this disclosure. The pool 103 further comprises a bed 131. The mesh structure 101 and the plurality of worm drives 102 forms a safety structure for the pool 103. The mesh structure 101 is a fluid permeable structure that inserts into the pool 103. The plurality of worm drives 102 attach to the mesh structure 101 such that the plurality of worm drives 102 raises and lower the mesh structure 101 within the pool 103. The mesh structure 101 forms a horizontally oriented supporting surface. The plurality of worm drives 102 adjusts the elevation of the mesh structure 101 such that the mesh structure 101 can lift a distressed swimmer out of the pool 103.

The pool 103 is a self-contained body of water. The pool 103 is a manmade structure. The plurality of worm drives 102 secures the mesh structure 101 within the pool 103 such that an additional supporting surface within the pool 103. The pool 103 forms a negative space. The pool 103 has the shape of a pan. The bed 131 forms the closed face of the pan structure of the pool 103. The plurality of worm drives 102 mount on the bed 131 of the pool 103.

The mesh structure 101 is a sheeting. The mesh structure 101 is a textile based structure. In the first potential embodiment of the disclosure, the mesh structure 101 is formed form fiberglass reinforced polymer yarns. The mesh structure has is formed as a mesh. The mesh formed by the mesh structure 101 creates a fluid impermeable surface that allows the mesh structure 101 to move easily through the water in the pool 103. The perimeter of the faces of the mesh structure 101 are geometrically similar to the water containment structure of the pool 103. The mesh structure 101 is sized such that the mesh structure 101 fits into the pool 103. The mesh structure 101 inserts into the pool 103 such that the faces of the textile structure of the mesh structure 101 form a horizontal surface that can be used to support an individual in the pool 103 as the plurality of worm drives 102 changes the elevation of the mesh structure 101 within the pool 103.

In the first potential embodiment of the disclosure, the mesh structure 101 is formed from a fiber reinforced polymer cordage. The fiber reinforced polymer is a high strength cordage suitable for use in life and death situations.

In a second potential embodiment of the disclosure, the mesh structure 101 has a rectangular shape with a two to one length to width ratio. The two to one length to width ratio is suitable for use is most swimming pools. The majority of swimming pools in the United States have a dimension selected from the group consisting of: a) 20 feet×10 feet; b) 24 feet×12 feet; c) 30 feet×15 feet; d) 36 feet×18 feet; and, e) 40 feet×20 feet.

Each of the plurality of worm drives 102 secures the mesh structure 101 to the pool 103 such that the elevation of the mesh structure 101 within the pool 103 is adjustable. The plurality of worm drives 102 is a mechanical structure. The plurality of worm drives 102 is an electrically powered structure. The plurality of worm drives 102 secure the mesh structure 101 to the pool 103. The plurality of worm drives 102 suspend the mesh structure 101 in the pool 103. The plurality of worm drives 102 provide the motive forces that change the elevation of the mesh structure 101 in the pool 103. The plurality of worm drives 102 work in unison to change the elevation of the horizontal surface formed by the mesh structure 101 in the pool 103.

The plurality of worm drives 102 comprises a collection of individual worm drive 122 apparatuses 120. Each individual worm drive 122 apparatus 120 is identical. Each individual worm drive 122 apparatus 120 is a mechanical structure. Each individual worm drive 122 apparatus 120 mounts on the bed 131 of the pool 103. Each individual worm drive 122 apparatus 120 attaches directly to the mesh structure 101. The individual worm drive 122 apparatus 120 suspends a portion of the mesh structure 101 in the pool 103. Each individual worm drive 122 apparatus 120 forms a portion of the load path that transfers the load of the mesh structure 101 to the bed 131 of the pool 103. Each individual worm drive 122 apparatus 120 comprises a worm drive 122 motor 121, a worm drive 122, and a worm drive 122 control circuit 123.

The worm drive 122 motor 121 is an electric motor. The worm drive 122 control circuit 123 controls the operation of the worm drive 122 motor 121. By controlling the operation of the worm drive 122 motor 121 is meant that the worm drive 122 control circuit 123 controls the direction of rotation of the worm drive 122 motor 121. By controlling the operation of the worm drive 122 motor 121 is further meant that the worm drive 122 control circuit 123 controls the speed of rotation of the worm drive 122 motor 121. The worm drive 122 motor 121 provides the motive forces that rotate the worm drive 122 to change the elevation of the mesh structure 101 in the pool 103.

The worm drive 122 is a mechanical structure. The worm drive 122 houses the worm drive 122 motor 121 and the worm drive 122 control circuit 123. The worm drive 122 is defined elsewhere in this disclosure. The worm drive 122 physically attaches the mesh structure 101 to the worm drive 122 motor 121 such that the rotation of the worm drive 122 motor 121 changes the elevation of the mesh structure 101 in the pool 103.

The worm drive 122 control circuit 123 is an electric circuit. The worm drive 122 control circuit 123 controls the operation of the worm drive 122 motor 121. By controlling the operation of the worm drive 122 control circuit 123 is meant that the worm drive 122 control circuit 123 controls the direction of rotation of the worm drive 122 motor 121. By controlling the operation of the worm drive 122 control circuit 123 is further meant that the worm drive 122 control circuit 123 controls the speed of rotation of the worm drive 122 motor 121. The worm drive 122 control circuit 123 provides the electrical power necessary to rotate the worm drive 122 motor 121. The worm drive 122 control circuit 123 is a remotely controlled circuit. The worm drive 122 control circuit 123 comprises a logic module 151, a receiver module 152, and an rc transmitter 153. The logic module 151 and the receiver module 152 are electrically connected. The receiver module 152 forms a wireless communication link 154 with the rc transmitter 153. The rc transmitter 153 transmits operating instructions to the logic module 151 through the receiver module 152 over the wireless communication link 154.

The logic module 151 is an electric circuit that is used to manage, regulate, and operate the worm drive 122 control circuit 123. Depending on the specific design and the selected components, the logic module 151 can be a separate component within the worm drive 122 control circuit 123 or the functions of the logic module 151 can be incorporated into another component within the worm drive 122 control circuit 123. The receiver module 152 is a wireless electronic communication device that allows the logic module 151 to wirelessly communicate the RC transmitter 153. Specifically, the receiver module 152 establishes a wireless communication link 154 between the worm drive 122 control circuit 123 and the RC transmitter 153.

The logic module 151 controls the operation of the worm drive 122 motor 121. The logic module 151 controls the direction of rotation of the worm drive 122 motor 121. The logic module 151 controls the speed of rotation of the worm drive 122 motor 121. The logic module 151 rotates the worm drive 122 motor 121 in the first direction to lower the mesh structure 101 within the pool 103. The logic module 151 rotates the worm drive 122 motor 121 in the second direction to raise the mesh structure 101 within the pool 103. The direction of rotation of the second direction is opposite to the direction of rotation of the first direction. The logic module 151 receives instruction for the direction of rotation from the worm drive 122 motor 121 from the rc transmitter 153 through the receiver module 152. The logic module 151 receives instruction for the speed of rotation of the worm drive 122 motor 121 from the rc transmitter 153 through the receiver module 152.

The rc transmitter 153 is a radio frequency transmitter. The rc transmitter 153 operating instructions to the receiver module 152 in the form of radio frequency control signals. An operating instruction transmitted by the rc transmitter 153 simultaneously causes each of the plurality of worm drives 102 to take the action received through the transmitted operating instruction. The receiver module 152 retransmits the received operating instructions to the logic module 151. The logic module 151 then implements the received operating instruction received through the radio frequency control signal. The rc transmitter 153 further comprises an up switch 161, a down switch 162, and a stop switch 163.

The up switch 161 is a switch that mounts on the rc transmitter 153. The actuation of the up switch 161 causes the rc transmitter 153 to transmit an operating instruction to the plurality of worm drives 102 that simultaneously causes each logic module 151 to rotate its associated individual worm drive 122 apparatus 120 in the direction that raises the mesh structure 101 within the pool 103.

The down switch 162 is a switch that mounts on the rc transmitter 153. The actuation of the down switch 162 causes the rc transmitter 153 to transmit an operating instruction to the plurality of worm drives 102 that simultaneously causes each logic module 151 to rotate its associated individual worm drive 122 apparatus 120 in the direction that lowers the mesh structure 101 within the pool 103.

The stop switch 163 is a switch that mounts on the rc transmitter 153. The actuation of the stop switch 163 causes the rc transmitter 153 to transmit an operating instruction to the plurality of worm drives 102 that simultaneously causes each logic module 151 to stop the rotation of its associated individual worm drive 122 apparatus 120.

In a second potential embodiment of the disclosure, the worm drive 122 control circuit 123 further comprises a personal data device 171, a plurality of speakers 172, and a plurality of lights 173. The plurality of speakers 172 and the plurality of lights 173 mount on the individual worm drive 122 apparatus 120 such that the plurality of speakers 172 and the plurality of lights 173 are visible from the exterior of the individual worm drive 122 apparatus 120. The personal data device 171 is maintained in the custody of an appropriate authority who is visually monitoring the pool 103.

The personal data device 171 is a programmable electrical device. The personal data device 171 further comprises an application. The personal data device 171 provides data management and communication services through one or more functions referred to as an application. The application is a set of logical operating instructions that are performed by the personal data device 171. The application of the personal data device 171 forms an interface between the worm drive 122 control circuit 123 and an appropriate authority using the invention 100. The personal data device 171 transmits operating instructions over a wireless communication link to the logic module 151 of the worm drive 122 control circuit 123. The operating instructions include: a) emergency instructions to raise and lower the mesh 101; b) instructions regarding the audible sounds announced over the plurality of speakers 172; and, c) instructions regarding the operation of the plurality of lights 173.

In the second potential embodiment of the disclosure, the applicant prefers that the forms factor of the individual worm drive 122 apparatus 120 have a stanchion shape that elevates the plurality of speakers 172 and the plurality of lights 173 above the water level of the pool 103.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Application or App: As used in this disclosure, an application or app is a self-contained piece of software that is especially designed or downloaded for use with a personal data device.

Bed: As used in this disclosure, a bed refers to the ground that forms the bottom of a body of water. Ground that is temporarily submerged under water is referred to as a flood bed.

Bluetooth™: As used in this disclosure, Bluetooth™ is a standardized communication protocol that is used to wirelessly interconnect electronic devices.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Communication Link: As used in this disclosure, a communication link refers to the structured exchange of data between two objects.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Cord: As used in this disclosure, a cord is a long, thin, flexible, and prism shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Exterior Screw Thread: An exterior screw thread is a ridge wrapped around the outer surface of a tube in the form of a helical structure that is used to convert rotational movement into linear movement.

External Power Source: As used in this disclosure, an external power source is a source of the energy that is externally provided to enable the operation of the present disclosure. Examples of external power sources include, but are not limited to, electrical power sources and compressed air sources.

Fiberglass: As used in this disclosure, fiberglass is a polymer-based (plastic) material that contains glass fibers. The glass fibers strengthen the polymer based material. Fiberglass can be extruded to form yarns suitable for use in textile structures.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Glass: As used in this disclosure, glass is a rigid structure that is formed by melting and then rapidly cooling a compound primarily composed of silica.

Helix: As used in this disclosure, a helix is the three-dimensional structure that would be formed by a wire that is wound uniformly around the surface of a cylinder or a cone. If the wire is wrapped around a cylinder the helix is called a cylindrical helix. If the wire is wrapped around a cone, the helix is called a conical helix. A synonym for conical helix would be a volute.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Interior Screw Thread: An interior screw thread is a groove that is formed around the inner surface of a tube in the form of a helical structure that is used to convert rotational movement into linear movement.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Mesh: As used in this disclosure, the term mesh refers to an openwork fabric made from threads, yarns, cords, wires, or lines that are woven, knotted, or otherwise twisted or intertwined at regular intervals. Synonyms for mesh include net. A mesh structure formed from metal bars or wires is often referred to as a grate.

Motor: As used in this disclosure, a motor refers to the method of transferring energy from an external power source into rotational mechanical energy.

Motor Controller: As used in this disclosure, a motor controller is an electrical device that is used to control the rotational speed, or simply the speed, and the direction of rotation of an electric motor. Motor controllers will generally receive one or more inputs which are used determine the desired rotational speed and direction of rotation of the electric motor.

Negative Space: As used in this disclosure, negative space is a method of defining an object through the use of open or empty space as the definition of the object itself, or, through the use of open or empty space to describe the boundaries of an object.

Nut: As used in this disclosure, a nut is a first object that is formed with a cylindrical negative space that further comprises an interior screw thread such that a second object with a matching exterior screw thread can screwed into the first object forming a threaded connection. A nut is further defined with an inner dimension.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

PDD: As used in this disclosure, PDD is an acronym for personal data device.

PDD Case: As used in this disclosure, a PDD case is a pan shaped armor structure. The PDD case is configured for use with a personal data device. The personal data device inserts into the PDD case. The PDD case creates a protected space for the personal data device. The PDD case is formed with the form factors and apertures necessary to allow for the operation of the personal data device. Use protected space and armor.

Personal Data Device: As used in this disclosure, a personal data device is a handheld logical device that is used for managing personal information and communication. Examples of personal data device include, but are not limited to, cellular phones, tablets, smartphones, and computers. See logical device Pool: As used in this disclosure, a pool is a self-contained body of water. By self-contained is meant that fluidic connections between the pool and the other bodies of water do not result in a significant change or difference in the water volume contained in the pool over a 24 hour period. A pool can be naturally formed or a manmade structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Remote Control: As used in this disclosure, remote control means the establishment of control of a device from a distance. Remote control is generally accomplished through the use of an electrical device that generates electrically based control signals that are transmitted via radio frequencies or other means to the device.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Spool: As used in this disclosure, a spool is a cylindrical device upon which a flexible material, including but not limited to a sheeting, yarn, a cord, or a tape, can be wound. Depending on context, a spool may also contain the flexible material stored upon the spool.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Suspend: As used in this disclosure, to suspend an object means to support an object such that the inferior end of the object does not form a significant portion of the load path of the object.

Textile: As used in this disclosure, a textile is a material that is woven, knitted, braided, or felted. Synonyms in common usage for this definition include fabric and cloth. The two surfaces of the textile with the greatest surface area are called the faces of the textile.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication link between two devices that does not require the use of physical cabling.

Wireless Communication Establishment Technology: As used in this disclosure, a wireless communication establishment technology refers to technology that establishes a wireless communication link between a first logical device and a second logical device. Usually, the operation of a wireless communication establishment technology is initiated by the push of a button. An example of such a technology is the WiFi™ protected setup technology (WPS™).

Worm Drive: As used in this disclosure, a worm drive refers to a mechanical arrangement where a rotating cylinder further comprising an exterior screw thread is used to: 1) rotate a gear; or 2) move a plate formed with an interior screw thread in a linear fashion in the direction of the center axis of the rotating cylinder. Worm drives are also referred to as worm gears.

With respect to the above description, it is to be realized that the optimum dimensional relationship for the various components of the invention described above and in FIGS.

1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A safety structure for a pool comprising
a mesh structure, a plurality of worm drives, and a pool;
wherein the mesh structure is a fluid permeable structure that inserts into the pool;
wherein the plurality of worm drives attach to the mesh structure such that the plurality of worm drives raises and lower the mesh structure within the pool;
wherein the mesh structure and the plurality of worm drives forms the safety structure for the pool;
wherein the plurality of worm drives comprises a collection of individual worm drive apparatuses;
wherein each individual worm drive apparatus comprises a worm drive motor, a worm drive, and a worm drive control circuit;
wherein the worm drive motor is an electric motor;
wherein the worm drive control circuit controls the operation of the worm drive motor;
wherein by controlling the operation of the worm drive motor is meant that the worm drive control circuit controls the direction of rotation of the worm drive motor;
wherein by controlling the operation of the worm drive motor is further meant that the worm drive control circuit controls the speed of rotation of the worm drive motor;
wherein the worm drive motor provides the motive forces that change the elevation of the mesh structure in the pool;
wherein the worm drive control circuit comprises a logic module, a receiver module, and an rc transmitter;
wherein the logic module and the receiver module are electrically connected;
wherein the receiver module forms a wireless communication link with the rc transmitter;
wherein the rc transmitter transmits operating instructions to the logic module through the receiver module over the wireless communication link.

2. The safety structure for a pool according to claim 1
wherein the mesh structure forms a horizontally oriented supporting surface;
wherein the plurality of worm drives adjusts the elevation of the mesh structure.

3. The safety structure for a pool according to claim 2
wherein the pool is a manmade structure;
wherein the plurality of worm drives secures the mesh structure within the pool such that the mesh structure forms an additional supporting surface within the pool;
wherein the pool forms a negative space;
wherein the pool has the shape of a pan.

4. The safety structure for a pool according to claim 3
wherein the pool further comprises a bed;
wherein the bed forms with the closed face of the pan structure of the pool;
wherein the plurality of worm drives mount on the bed of the pool.

5. The safety structure for a pool according to claim 4
wherein the mesh structure is a sheeting;
wherein the mesh structure is a textile based structure;
wherein the mesh structure has is formed as a mesh;
wherein the mesh formed by the mesh structure creates a fluid impermeable surface.

6. The safety structure for a pool according to claim 5
wherein the perimeter of the faces of the mesh structure are geometrically similar to the pool;
wherein the mesh structure is sized such that the mesh structure fits into the pool;
wherein the mesh structure inserts into the pool such that the faces of the textile structure of the mesh structure form a horizontal surface.

7. The safety structure for a pool according to claim 6
wherein the plurality of worm drives is a mechanical structure;
wherein the plurality of worm drives is an electrically powered structure;
wherein the plurality of worm drives secure the mesh structure to the pool;
wherein the plurality of worm drives suspend the mesh structure in the pool;
wherein the plurality of worm drives provide the motive forces that change the elevation of the mesh structure in the pool.

8. The safety structure for a pool according to claim 7
wherein each individual worm drive apparatus is identical;
wherein each individual worm drive apparatus mounts on the bed of the pool;
wherein each individual worm drive apparatus attaches directly to the mesh structure;
wherein the individual worm drive apparatus suspends a portion of the mesh structure in the pool;
wherein each individual worm drive apparatus forms a portion of the load path that transfers the load of the mesh structure to the bed of the pool.

9. The safety structure for a pool according to claim 8
wherein the worm drive is a mechanical structure;
wherein the worm drive houses the worm drive motor and the worm drive control circuit;
wherein the worm drive physically attaches the mesh structure to the worm drive motor such that the rotation of the worm drive motor changes the elevation of the mesh structure in the pool.

10. The safety structure for a pool according to claim 9
wherein the worm drive control circuit is an electric circuit;
wherein the worm drive control circuit controls the operation of the worm drive motor;
wherein by controlling the operation of the worm drive control circuit is meant that the worm drive control circuit controls the direction of rotation of the worm drive motor;
wherein by controlling the operation of the worm drive control circuit is further meant that the worm drive control circuit controls the speed of rotation of the worm drive motor;
wherein the worm drive control circuit provides the electrical power necessary to rotate the worm drive motor;

wherein the worm drive control circuit is a remotely controlled circuit.

11. The safety structure for a pool according to claim 10 wherein the logic module is an electric circuit;
wherein the receiver module is a wireless electronic communication device;
wherein the receiver module establishes the wireless communication link between the worm drive control circuit and the rc transmitter;
wherein the logic module controls the operation of the worm drive motor;
wherein the logic module controls the direction of rotation of the worm drive motor;
wherein the logic module controls the speed of rotation of the worm drive motor;
wherein the logic module rotates the worm drive motor in the first direction to lower the mesh structure within the pool;
wherein the logic module rotates the worm drive motor in the second direction to raise the mesh structure within the pool;
wherein the direction of rotation of the second direction is opposite to the direction of rotation of the first direction;
wherein the logic module receives instruction for the direction of rotation from the worm drive motor from the rc transmitter through the receiver module;
wherein the logic module receives instruction for the speed of rotation of the worm drive motor from the rc transmitter through the receiver module.

12. The safety structure for a pool according to claim 11 wherein the rc transmitter is a radio frequency transmitter;
wherein the rc transmitter operating instructions to the receiver module in the form of radio frequency control signals;
wherein an operating instruction transmitted by the rc transmitter simultaneously causes each of the plurality of worm drives to take the action received through the transmitted operating instruction;
wherein the receiver module retransmits the received operating instructions to the logic module;
wherein the logic module then implements the received operating instruction received through the radio frequency control signal;
wherein the rc transmitter further comprises an up switch, a down switch, and a stop switch;
wherein the up switch is a switch that mounts on the rc transmitter;
wherein the actuation of the up switch causes the rc transmitter to transmit an operating instruction to the plurality of worm drives that simultaneously causes each logic module to rotate its associated individual worm drive apparatus in the direction that raises the mesh structure within the pool;
wherein the down switch is a switch that mounts on the rc transmitter;
wherein the actuation of the down switch causes the rc transmitter to transmit an operating instruction to the plurality of worm drives that simultaneously causes each logic module to rotate its associated individual worm drive apparatus in the direction that lowers the mesh structure within the pool;
wherein the stop switch is a switch that mounts on the rc transmitter;
wherein the actuation of the stop switch causes the rc transmitter to transmit an operating instruction to the plurality of worm drives that simultaneously causes each logic module to stop the rotation of its associated individual worm drive apparatus.

* * * * *